United States Patent [19]
Takahashi et al.

[11] 3,777,588
[45] Dec. 11, 1973

[54] INTERMEDIATE GEAR

[76] Inventors: Takashi Takahashi, 1-458 Soshigaya, Setagayaku, Tokyo; Teru Hayashi, 413-4 Minamitsunashimacho, Kohokuku, Yokohama, both of Japan

[22] Filed: June 23, 1972

[21] Appl. No.: 265,572

[52] U.S. Cl. .................................. 74/440, 74/467
[51] Int. Cl. ...................... F16h 55/18, F16h 57/04
[58] Field of Search.................. 74/410, 440, 439, 74/467, 468

[56] References Cited
UNITED STATES PATENTS

| | | | |
|---|---|---|---|
| 2,663,198 | 12/1953 | Cairnes | 74/440 X |
| 2,966,806 | 1/1961 | Luning | 74/440 X |
| 3,138,035 | 6/1964 | Sivaslian | 74/440 |

*Primary Examiner*—Leonard H. Gerin
*Attorney*—Charles E. Temko

[57] ABSTRACT

This invention relates to an intermediate gear which is divided into two concentric portions, the inner portion of which being provided with a flange gear which is in mesh with either the driving or driven gear.

1 Claim, 3 Drawing Figures

INTERMEDIATE GEAR

This invention relates to an intermediate gear which is shock absorbing and counteracting uneven load distribution among the teeth of said intermediate gear as well as co-operating gears.

The invention is illustrated in the accompanying drawing, wherein.

Figure 1:
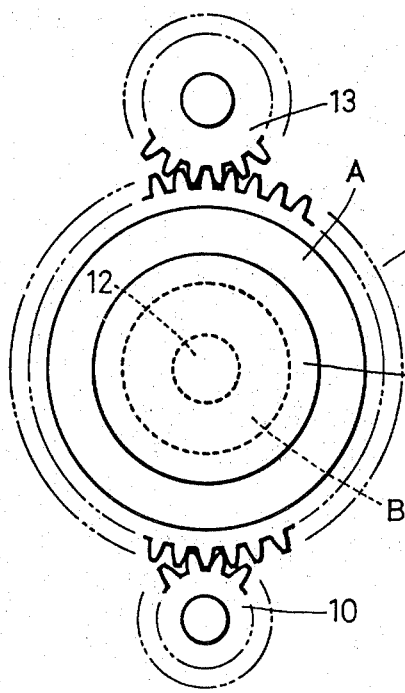
FIG. 1 shows a plan view of a gear system.

The principle of this invention will be explained with reference to FIG. 1. The gear system shown there consists of a driving gear 10, a driving gear 13 and an intermediate gear 11 which is loosely mounted on a fixed shaft 12 so as rotate freely around said shaft. In such a gear system, because load is not distributed uniformly among the teeth of the gears due to unavoidable manufacturing deficiency and by the shocks caused by sudden changes of the driving torque, often breakage of the teeth results.

Previously, in order to avoid such a drawback, we have divided the intermediate gear 11 into two concentric portions A and B so as to utilize the spring action produced by the oil film between them.

It is clear from Reynold's theory on bearing mechanism that if said portions rotate together in the same direction with the same velocity under load condition, the oil film will bulge partially. Such a thick oil layer can exert great bouncing action to absorb the shocks and distribute the load evenly among the gear teeth.

However, in practice, as the inner portion B rotates much slower than the outer portion A, it is impossible to obtain the best thick oil layer.

This invention has its object to overcome such a difficulty.

Figure 2:
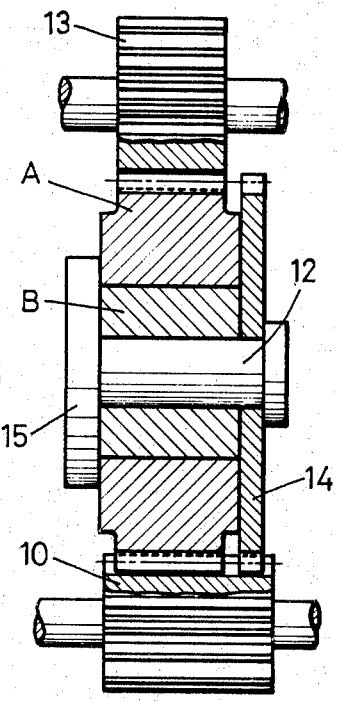
FIG. 2 shows a partial view of the gear system according to this invention.

According to this invention, a toothed flange 14 is attached to one side of the intermediate gear's inner portion B and put it in mesh with the driving gear 10 as shown in FIG. 2. 15 is a frame to which the shaft 12 is attached.

As is obvious from the above, by this arrangement, the inner portion B is forced to rotate with the same velocity simultaneously with the outer portion A whereby the thickening of the oil film will be realized between A and B as desired. Instead of one toothed flange, two may be respectively attached to both sides of the inner portion B. Further, the toothed flange may be in mesh with the driven gear in lieu of the driving gear.

Figure 3:
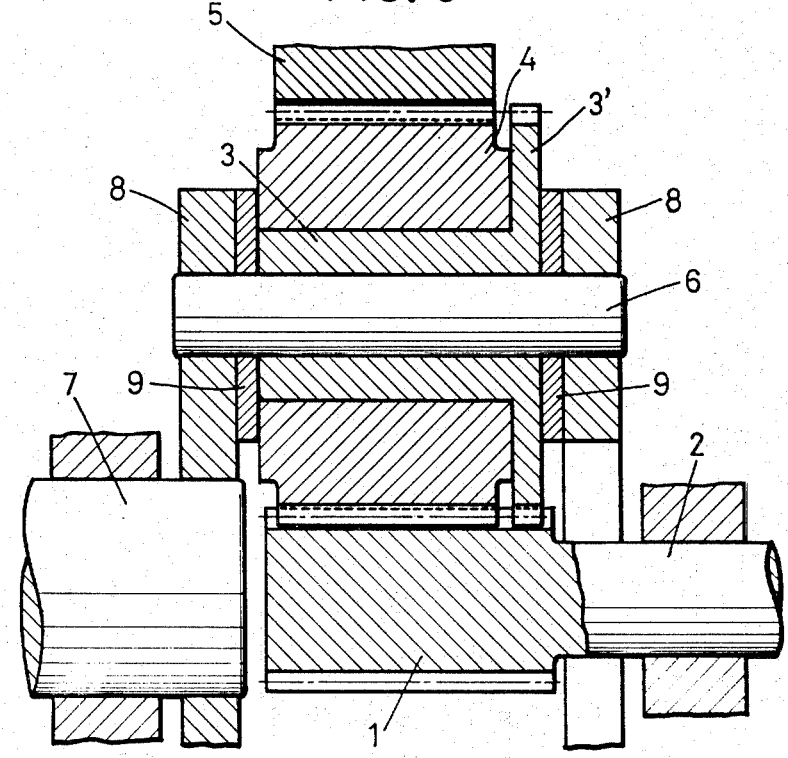
FIG. 3 is a partial view of a planetary gear system according to this invention.

FIG. 3 shows a planetary gear system constructed in accordance with this invention wherein 1 is a driving gear, 2 is a driving shaft, 5 is an inner toothed gear, 6 is a shaft for supporting a planetary gear consisting of two concentric portions 3 and 4, 7 is a driven shaft, 8 are spiders for supporting the shaft 6, and 9 are spacers.

A toothed flange 3' is attached to one side of the inner portion 3 and is in mesh with the driving gear.

As is clear from the above, the inner portion 3 and the outer portion 4 of the planetary gear are obliged to rotate simultaneously in the same direction and with the same velocity whereby the oil film between them will be thicken partially which exerts excellent bouncing action to counteract the unbalanced load distribution as well as to absorb shocks. Thus, the breakage of gear teeth can effectively be prevented.

What I claim is:

1. In a gear train including a driving gear, an intermediate gear, and a driven gear, the improvement comprising: said intermediate gear including inner and outer concentric portions defining an interstice therebetween, a filling of oil disposed in said interstice, a shaft supporting said inner portion of said intermediate gear, and a toothed side flange supported by said shaft and meshing with said driven gear.

* * * * *